United States Patent
Lee et al.

(10) Patent No.: US 10,923,957 B2
(45) Date of Patent: Feb. 16, 2021

(54) WIRELESS POWER TRANSFER SYSTEM

(71) Applicant: The University of Hong Kong, Hong Kong (CN)

(72) Inventors: Chi Kwan Lee, Hong Kong (CN); Shu Yuen Ron Hui, Hong Kong (CN); Jialong Qu, Harbin (CN)

(73) Assignee: The University of Hong Kong, Hong Kong (CN)

( * ) Notice: Subject to any disclaimer, the term of this patent is extended or adjusted under 35 U.S.C. 154(b) by 230 days.

(21) Appl. No.: 16/036,391

(22) Filed: Jul. 16, 2018

(65) Prior Publication Data

US 2018/0323653 A1 Nov. 8, 2018

Related U.S. Application Data

(63) Continuation-in-part of application No. 15/355,978, filed on Nov. 18, 2016, now Pat. No. 10,573,455.
(Continued)

(51) Int. Cl.
*H01F 5/00* (2006.01)
*H02J 5/00* (2016.01)
(Continued)

(52) U.S. Cl.
CPC .............. *H02J 50/12* (2016.02); *H02J 7/025* (2013.01); *H02J 50/05* (2016.02); *H02J 50/50* (2016.02)

(58) Field of Classification Search
CPC .. H02J 50/12; H02J 50/50; H02J 7/025; H02J 50/05
See application file for complete search history.

(56) References Cited

U.S. PATENT DOCUMENTS 3,251,014 A 5/1966 Stein, Jr.
6,051,796 A 4/2000 Kuhl et al.
(Continued)

FOREIGN PATENT DOCUMENTS

CN 102024533 B 7/2012
CN 103219806 A 7/2013
(Continued)

OTHER PUBLICATIONS (Lee, et.al, "Magnetic resonant wireless power delivery for distributed sensor and wireless systems", Proc. IEEE Topical Conf. Wireless Sensors Sensor Network, pp. 13-16, 2012) (Year: 2012).*
(Continued)

*Primary Examiner* — Jared Fureman
*Assistant Examiner* — Esayas G Yeshaw
(74) *Attorney, Agent, or Firm* — Saliwanchik, Lloyd & Eisenschenk

(57) ABSTRACT

Devices and systems of inductive-capacitive (LC) coil-resonators that can be embedded easily inside high-voltage insulation discs are provided. Each LC coil-resonator comprises spiral conductive tracks fabricated or printed in the form of at least two layers of planar spiral windings on electrically non-conductive materials. The planar conductive windings on at least two parallel layers may be connected to form a closed winding. The distributed inductance associated with the planar spiral windings and the distributed capacitance between the layers of the conductive tracks form an equivalent LC coil-resonator. When these LC coil-resonators are embedded in some or all of the insulation discs in a high-voltage insulation rod, they form the relay coil-resonators for wireless power transfer.

15 Claims, 25 Drawing Sheets

Related U.S. Application Data

(60) Provisional application No. 62/256,726, filed on Nov. 18, 2015.

(51) Int. Cl.
*H02J 50/12* (2016.01)
*H02J 50/05* (2016.01)
*H02J 7/02* (2016.01)
*H02J 50/50* (2016.01)

(56) References Cited

U.S. PATENT DOCUMENTS

| | | | |
|---|---|---|---|
| 8,432,125 | B2 | 4/2013 | Takada et al. |
| 8,587,155 | B2 | 11/2013 | Giler et al. |
| 9,685,826 | B1 | 6/2017 | Bhatti |
| 10,122,183 | B2 * | 11/2018 | Lim ................ H02J 5/005 |
| 2009/0058189 | A1 | 3/2009 | Cook et al. |
| 2009/0128262 | A1 | 5/2009 | Lee et al. |
| 2009/0153273 | A1 | 6/2009 | Chen et al. |
| 2010/0201204 | A1 | 8/2010 | Sakoda et al. |
| 2011/0101788 | A1 | 5/2011 | Sun et al. |
| 2011/0279278 | A1 | 11/2011 | Al-Absi et al. |
| 2012/0013198 | A1 | 1/2012 | Uramoto |
| 2012/0248890 | A1 | 10/2012 | Fukushima |
| 2013/0093390 | A1 | 4/2013 | Partovi |
| 2013/0285269 | A1 | 10/2013 | Kim |
| 2014/0015470 | A1 | 1/2014 | Lim et al. |
| 2014/0021794 | A1 | 1/2014 | Kim et al. |
| 2014/0028112 | A1 | 1/2014 | Hui et al. |
| 2014/0290386 | A1 * | 10/2014 | Wang ................ G01L 3/105 73/862.193 |
| 2015/0061591 | A1 | 3/2015 | Armstrong et al. |
| 2015/0108945 | A1 | 4/2015 | Yan et al. |
| 2015/0171519 | A1 | 6/2015 | Han et al. |
| 2015/0228402 | A1 | 8/2015 | Zhong et al. |
| 2015/0270719 | A1 * | 9/2015 | Kurs ................ H04N 5/64 320/108 |
| 2016/0043571 | A1 | 2/2016 | Kesler et al. |
| 2016/0191123 | A1 | 6/2016 | Mukherjee |
| 2016/0281674 | A1 * | 9/2016 | Ikeda ................ H05H 1/52 |
| 2018/0006366 | A1 * | 1/2018 | Hur ................ H01Q 1/24 |

FOREIGN PATENT DOCUMENTS

| | | |
|---|---|---|
| CN | 103443883 A | 12/2013 |
| CN | 204101480 U | 1/2015 |
| CN | 104578439 A | 4/2015 |
| EP | 2 884 292 A1 | 6/2015 |
| WO | WO-2012/086473 A1 | 6/2012 |

OTHER PUBLICATIONS

Zhong, W. et al., "General Analysis on the Use of Tesla's Resonators in Domino Forms for Wireless Power Transfer", *IEEE Transactions on Industrial Electronics*, Jan. 2013, 60(1):261-270, IEEE.

Lee, C.K. et al., "Effects of Magnetic Coupling of Nonadjacent Resonators on Wireless Power Domino-Resonator Systems", *IEEE Transactions on Power Electronics*, Apr. 2012, 27(4):1905-1916, IEEE.

Zhong, W.X. et al., "Wireless Power Domino-Resonator Systems With Noncoaxial Axes and Circular Structures", *IEEE Transactions on Power Electronics*, Nov. 2012, 27(11):4750-4762, IEEE.

Berthiaume, R. et al., "Microwave Repeater Power Supply Tapped From the Overhead Ground Wire on 735 kV Transmission Lines", *IEEE Transactions on Power Apparatus and Systems*, Jan./Feb. 1980, PAS-99(1):183-184, IEEE.

Kurs, A. et al., "Wireless Power Transfer via Strongly Coupled Magnetic Resonances", *Science*, Jul. 6, 2007, 317(5834):83-86, 10.1126/science.1143254, American Association for the Advancement of Science, Washington, DC.

Hui, S.Y.R. et al., "A Critical Review of Recent Progress in Mid-Range Wireless Power Transfer", *IEEE Transactions on Power Electronics*, Sep. 2014, 29(9):4500-4511, IEEE.

Lee, B.J. et al., "Magnetic Resonant Wireless Power Delivery for Distributed Sensor and Wireless Systems", *Proc. IEEE Topical Conf. Wireless Sensors Sensor Network*, WiSNet 2012, 2012, 13-16, IEEE.

Yli-Hannuksela, J., "The Transmission Line Cost Calculation", *University of Applied Science*, 2011, 1-72.

Notice of Allowance dated Nov. 6, 2019 in U.S. Appl. No. 15/355,978.

Merriam-Webster, "Definition of Disc," pp. 1-2.

Office Action dated Jan. 11, 2019 in U.S. Appl. No. 15/355,978.

Supplementary European Search Report dated Jul. 4, 2019 in European Application No. 16865776.5.

International Search Report and Written Opinion dated Jan. 26, 2017 in International Application No. PCT/CN2016/106225.

* cited by examiner

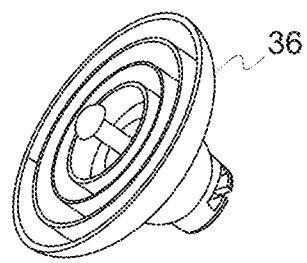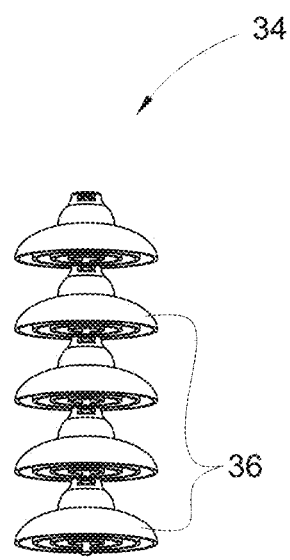
FIG. 4a
(PRIOR ART)
FIG. 4b
(PRIOR ART)

(a) Top view of the Top Layer (b) Top view of the bottom layer (c) Side view of double-layer winding (a) Top view of the Top Layer (b) Top view of the bottom layer (c) Side view of double-layer winding

US 10,923,957 B2

WIRELESS POWER TRANSFER SYSTEM

CROSS-REFERENCE TO RELATED APPLICATIONS

This application is a continuation-in-part of U.S. application Ser. No. 15/355,978, filed Nov. 18, 2016, which claims priority to and the benefit of U.S. Provisional Patent Application Ser. No. 62/256,726, filed on Nov. 18, 2015, which is incorporated herein by reference in its entirety, including any figures, tables, and drawings.

FIELD OF THE INVENTION

The invention relates to a wireless power transfer system suitable for high voltage power transmission line systems.

BACKGROUND

The Smart Grid and the Internet of Things have prompted active research in recent years to set up online monitoring systems for power transmission systems. Such monitoring systems are particularly important and critical to some regions such as, for example, China, which has suffered several large-scale blackouts in recent years due to heavy snow storms in central and northern China and typhoons in southern China. The 2008 power blackout in China resulted in an estimated total financial loss exceeding 100 billion RMB (approx. US$65 billion). The seriousness of the power blackout problems in China is such that there is a growing body of research in China related to improving online monitoring of power transmission systems using monitoring devices and systems mounted on power transmission system towers.

Online monitoring systems for power transmission towers and cables cover a range of monitoring services such as electric parameters (e.g., voltage, current, phase angle, and power), mechanical parameters (e.g., tower structure, cable galloping, ice/snow thickness, and wind-induced mechanical vibration of transmission tower), thermal parameters (e.g., cable temperature), and weather information (e.g., wind speed, temperature and lightning, and pollution level), as well as anti-theft monitoring.

Traditionally, solar panels are used to harvest solar energy and store in batteries to power these online monitoring systems in high-voltage (HV) transmission towers. But this approach has many drawbacks as illustrated in the 2008 power blackout in China. First, solar energy harvesting is weather dependent and is not reliable. Second, the size of the batteries has to be very large because solar energy is not available 24 hours per day. Prolonged cloudy periods could lead to stoppage of the online monitoring systems due to lack of power.

Some known monitoring systems for high voltage power transmission systems are powered by solar panel units mounted on the power transmission towers. One problem with such a form of power supply is the intermittency of available solar energy, which is exacerbated during prolonged periods of inclement weather, which can lead to depletion of charge in the solar panel unit's batteries and thus the powering down of the monitoring system.

R. Berthiaume and R. Blais, "Microwave repeater power supply tapped from the overhead ground wire on 735 kV transmission lines," IEEE Trans. Power App. Syst., vol. PAS-99, no. 1, pp. 183-184, January/February 1980, discloses a technique in which microwave repeaters are used to transmit power harvested from the high voltage power transmission cables from one point to another.

A. Kurs, A. Karalis, R. Moffatt, J. D. Joannopoulos, P. Fisher, and M. Soljacic, "Wireless power transfer via strongly coupled magnetic resonances," Science, vol. 317, no. 5834, pp. 83-86, July 2007, discloses a mid-range wireless power transfer technique using magnetic resonance. The magnetic resonance wireless power transfer technique disclosed by Kurs adopts the Maximum Power Transfer Principle that has the limitation of poor system efficiency. For any circuit that operates with the Maximum Power Transfer Theorem via impedance matching with the source impedance, there is an inherent limitation that the energy efficiency of the system cannot be higher than 50% For a transmission distance of about 2 meters, the system energy efficiency is at best 15%, as discussed in S. Y. R. Hui, W. X. Zhong and C. K. Lee, "A critical review of recent progress in mid-range wireless power transfer", IEEE Transactions on Power Electronics, Vol. 29, No. 9, September 2014, pp:4500-4511.

Wireless domino-resonator wireless power transfer systems have been disclosed in:

[1] S. Y. R. Hui and W. X. Zhong, "Apparatus and Method for Wireless Power Transfer", Patent application PCT/IB2011/000050, 14 Jan. 2011;

[2] W. X. Zhong, C. K. Lee and S. Y. R. Hui, "General Analysis on the Use of Tesla's Resonators in Domino Forms for Wireless Power Transfer", IEEE Transactions on Industrial Electronics, Vol. 60, No. 1, January 2013, pp: 261-270;

[3] C. K. Lee, W. X. Zhong and S. Y. R. Hui, "Effects of Magnetic Coupling of Non-adjacent Resonators on Wireless Power Domino-Resonator Systems", IEEE Transactions on Power Electronics, Volume: 27, Issue: 4, 2012, Page(s): 1905-1916; and

[4] W. X. Zhong, C. K. Lee and S. Y. R. Hui, "Wireless Power Domino-Resonator Systems with Non-coaxial axes and Circular Structures", IEEE Transactions on Power Electronics Volume: 27, Issue: 11, 2012, Page(s): 4750-4762.

The wireless domino-resonator systems in [1] to [4] have been practically proven to provide a highly efficient way to transfer wireless power over a few meters. Unlike the Kurs proposal, the wireless domino-resonator systems adopt the Maximum Energy Efficiency Principle and can achieve an overall system energy efficiency higher than 50%. One advantage of the wireless domino-resonator systems is that the resonators can be arranged flexibly to guide the wireless power flow rather than being limited to straight-line power transmission.

In view of the increasing demand for powering online monitoring systems for power transmission towers and transmission lines, there is a need for new insulator structures that can provide (1) high-voltage (HV) insulation and (2) wireless power transfer (WPT) capabilities.

In a recent patent application [S. Y. R. Hui and C. Zhang, "A wireless power transfer system", U.S. Provisional Patent Application Ser. No. 62/256,726, filed on Nov. 18, 2015] (PCT/CN2016/106225) and a research publication [Zhang, C., Lin D. Y., Tang N. and Hui S. Y. R., "A Novel Electric Insulation String Structure with High-Voltage Insulation and Wireless Power Transfer Capabilities", IEEE Transactions on Power Electronics, Volume: 33, Issue: 1, January 2018, pp:87-96], a novel high-voltage insulation rod with the insulation discs embedded with LC coil-resonators has been successfully demonstrated for transmitting electric power wirelessly from one end of the insulation rod to another. FIG. 11 shows a typical HV insulation rod (also called insulation string). In HV power transmission networks, the HV insulation rod 100 is used to hold the HV cable to the transmission tower, as shown in FIG. 12. Embodiment of the subject invention, as seen in FIG. 13, involves the use of (1) a current transformer to harvest energy continuously from the magnetic field around the HV cable (carrying AC current), (2) an AC-DC power converter to provide a DC power source, (3) a high-frequency DC-AC power inverter to drive a transmitter coil-resonator, (4) an insulation rod with LC coil-resonators embedded inside some of the insulation discs for providing both HV insulation and wireless power transfer (WPT) functions, and (5) a receiver coil-resonator with a high-frequency AC-DC power converter which provides a DC voltage for the online monitoring systems.

This system is the first practical application of the wireless domino-resonator systems previously reported in a research publication [C. K. Lee, W. X. Zhong and S. Y. R. Hui, "Effects of magnetic coupling of non-adjacent resonators on wireless power domino-resonator systems", IEEE Transactions on Power Electronics, Volume: 27, Issue: 4, 2012, Page(s): 1905-1916].

A previous invention in U.S. patent application 62/256, 726 (PCT/CN2016/106225) offered a continuous and "weather-independent" energy-harvesting solution to power online monitoring systems in HV transmission towers. In the previous works, an LC coil-resonator was formed of a manually wound coil connected to a capacitor in order to form a closed LC circuit.

BRIEF SUMMARY

In an embodiment, an insulator device comprises: a body formed of an electrically insulating material, said body defining a cavity; and a resonator coil located within said cavity, said coil being configured for resonant inductive coupling with a similar such coil when placed in the vicinity of the similar such coil.

In another embodiment, an insulator comprises a series of connected insulator devices, a plurality of said series of insulator devices each comprising a body formed of an electrically insulating material, said body defining a cavity, and a resonator coil located within said cavity, said coil being configured for resonant inductive coupling with a similar such coil when placed in the vicinity of the similar such coil, wherein the plurality of insulator devices having a resonator coil are arranged within the series of devices so as to enable the near field transmission of electrical energy from a first end of the series to a second end of the series.

In another embodiment, a wireless power transfer system comprises: an insulator having a series of connected insulator devices, a plurality of said series of insulator devices each comprising a body formed of an electrically insulating material, said body defining a cavity, and a resonator coil located within said cavity, said coil being configured for resonant inductive coupling with a similar such coil when placed in the vicinity of the similar such coil; an energy transmitting coil magnetically coupled to a first resonator coil insulator device of said series of connected insulator devices for wirelessly delivering electrical energy to said first resonator coil insulator device; and an energy receiving coil magnetically coupled to a last resonator coil insulator device of said series of connected insulator devices for wirelessly receiving electrical energy from said last resonator coil insulator device, wherein the plurality of insulator devices having a resonator coil are arranged within the series of devices so as to enable the near field transmission of electrical energy from a first end of the series to a second end of the series.

In another embodiment, a method of monitoring a power transmission line comprises providing the power transmission line with a monitoring apparatus powered by electrical energy harvested from the powerline and transmitted to the monitoring apparatus using a wireless power transfer system as described herein (e.g., the wireless power transfer system of the previous paragraph).

Other aspects of the invention are in accordance with the appended claims.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments, which are provided by way of example only in connection with the accompanying figures, of which:

FIGS. 4a and 4b show a known toughened glass insulator disc for a high voltage power transmission system tower and an insulator comprising a series of connected insulator discs, respectively;

DETAILED DESCRIPTION

The following description is of preferred embodiments by way of example only and without limitation to the combination of features necessary for carrying the invention into effect.

Figure 1:
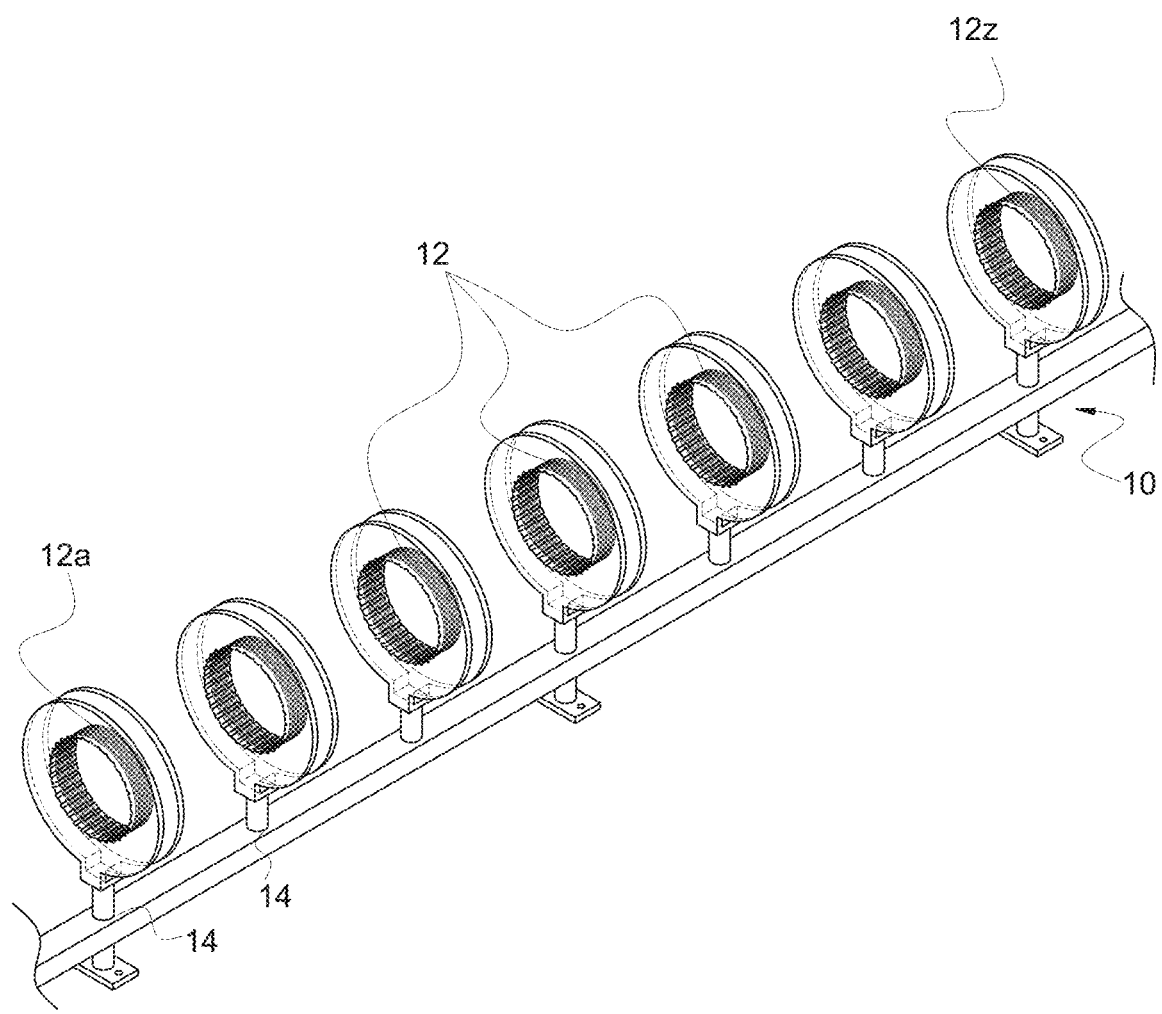
FIG. 1 shows a known straight wireless power domino resonator system.

FIG. 1 shows a known straight wireless power transfer domino resonator system 10 consistent with the disclosures of [1] to [4] above. The system 10 has a plurality of LC resonator coils 12 arranged on supports 14 in a spaced-apart series in a straight line such that adjacent coils 12 become magnetically coupled to wirelessly transfer electrical energy from a first coil 12a in the series to the last coil 12z in the series.

Figure 2:
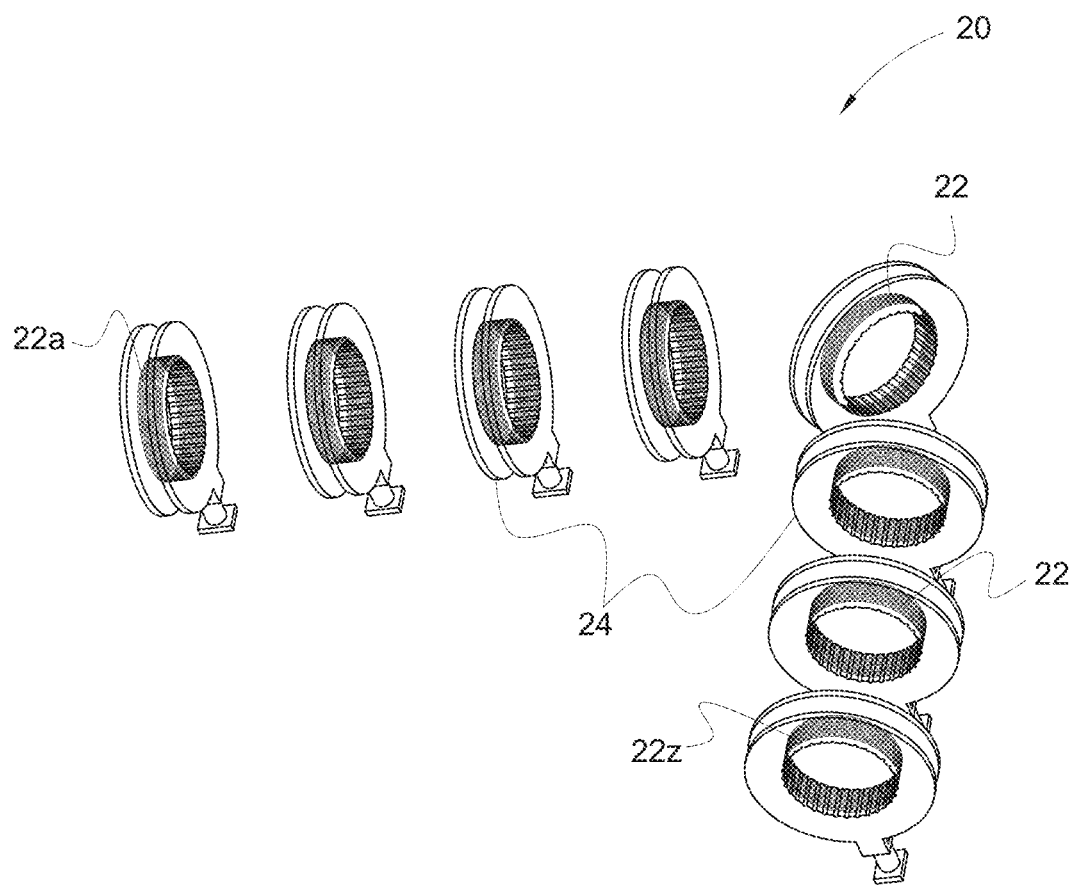
FIG. 2 shows a known curved wireless power domino resonator system.

FIG. 2 shows a known curved wireless power transfer domino resonator system 20 consistent with the disclosures of [1] to [4] above. The system 20 also has a plurality of LC resonator coils 22 arranged on supports 24 in a spaced apart series, but arranged in a curve to illustrate that it is possible for magnetically coupled adjacent coils 22 to wirelessly transfer electrical energy from a first coil 22a in the series to the last coil 22z in the series over a curved pathway.

Figure 3:
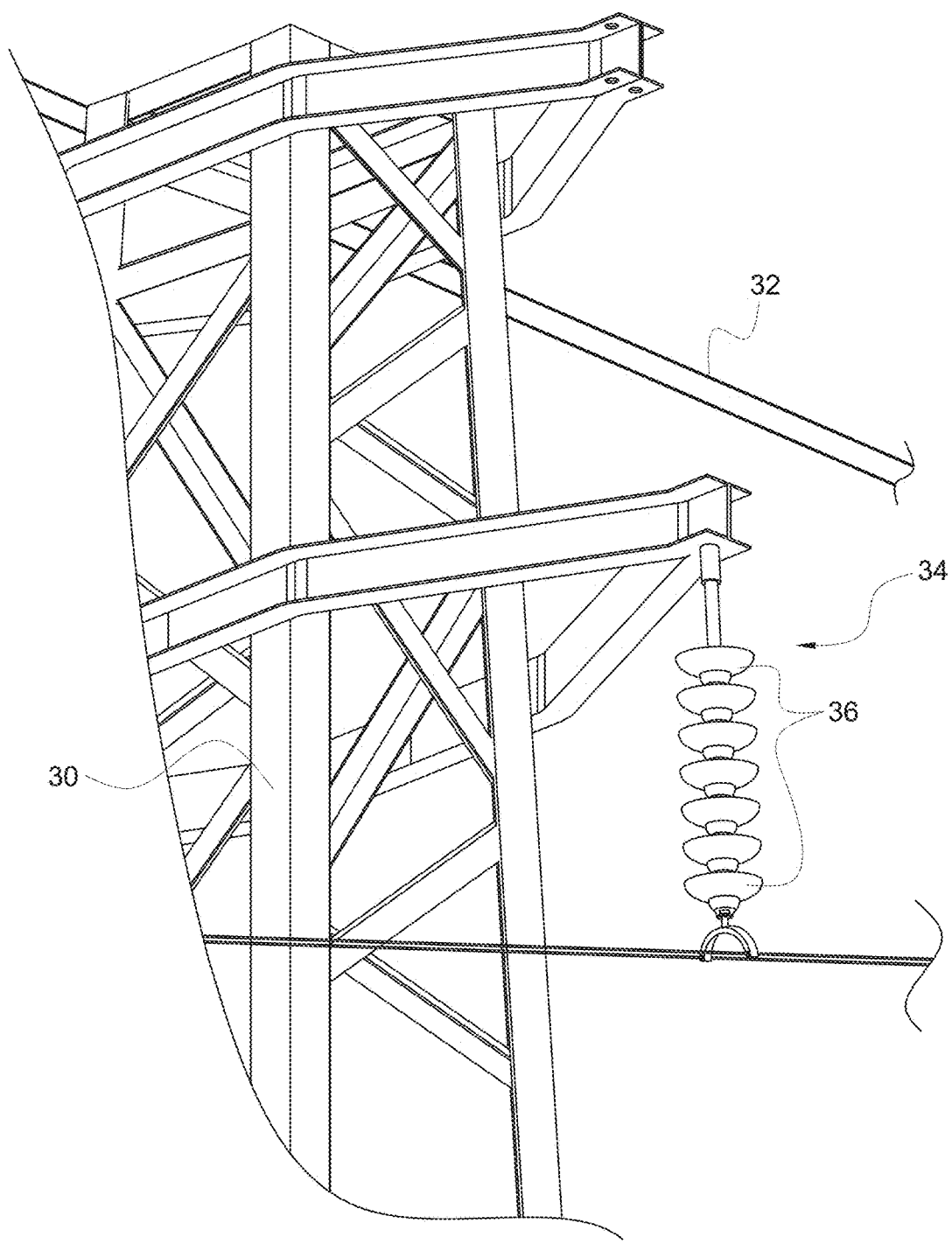
FIG. 3 shows a typical insulator for a high voltage power transmission system tower.

FIG. 3 shows a power transmission line system tower 30 supporting a plurality of high voltage power lines 32 by means of known insulators 34. The insulator 34 comprises a series of connected insulator discs 36 as better seen in FIGS. 4a and 4b and FIGS. 5a and 5b, although these figures merely depict one type of power transmission line system insulator.

Figure 5A:
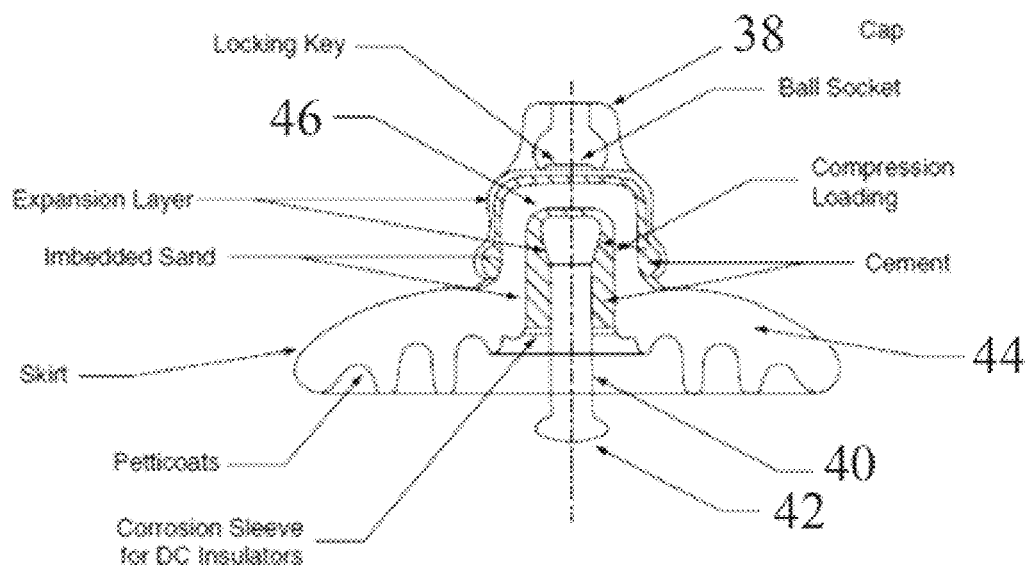
FIGS. 5a and 5b show schematic cross-sectional diagrams of a known insulator disc for a high voltage power transmission system tower and an insulator comprising a series of connected insulator discs, respectively.
Figure 5B:
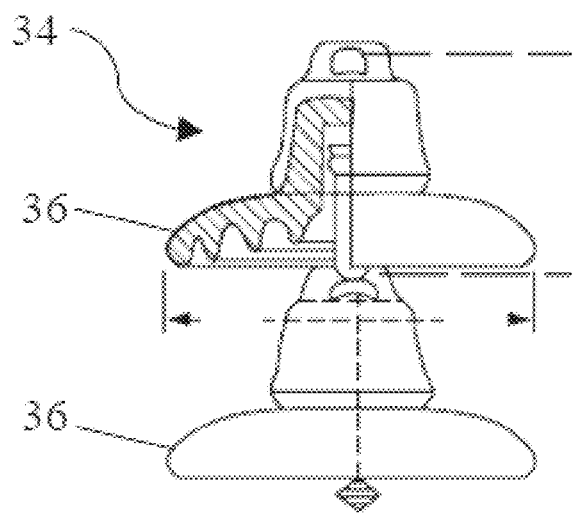

Referring to FIG. 5a, each insulator disc 36 has a cap 38 defining a ball socket, and a central pin 40 having a ball 42 at an exposed end thereof, the central pin 40 being cemented or otherwise affixed in a cavity of a porcelain or glass body 44 where the insulator body 44 has an insulated head 46, which separates and insulates the ball socket from the central pin 40. Referring to FIG. 5b, two insulator discs 36 can be arranged in a series by inserting the ball 42 of one disc 36 into the ball socket of an adjacent disc 36. It will be understood that FIGS. 3 to 5 are merely illustrative of one form of insulator 34 and that others are known, which employ different connection methods, but share the feature that a string of discs 36 forming an insulator 34 provides an insulator 34 that may not only provide insulation for a high voltage power transmission line from other transmission components including the tower, but act as a mechanical device to support a power transmission line.

Embodiments of the subject invention relate to new structures of insulator discs with embedded resonator coils. By linking the insulator discs in a series using an appropriate mechanical mechanism, the insulator discs form an insulator, insulator string, or insulator rod for a high power transmission line system. The resonator coils embedded inside the insulator discs therefore form a series of relay resonators that can be used for wireless power transfer through the principle of near-field magnetic coupling and resonance. Such an insulator string can provide the simultaneous functions of voltage insulation and wireless power transfer over the length of the string or rod. Applications of embodiments of the subject invention are particularly suitable for, but not limited to, wireless power transfer in a high-voltage environment, such as encountered in high-voltage power transmission line systems.

Figure 6:
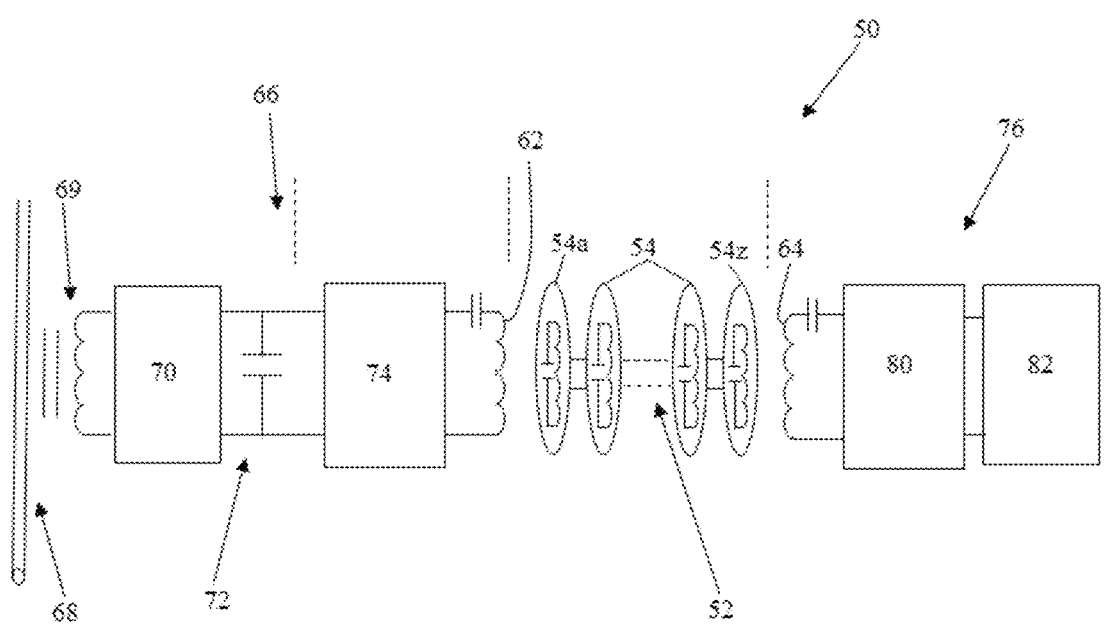
FIG. 6 is a schematic block diagram of a wireless power transfer system in accordance with an embodiment of the subject invention.
Figure 8A:
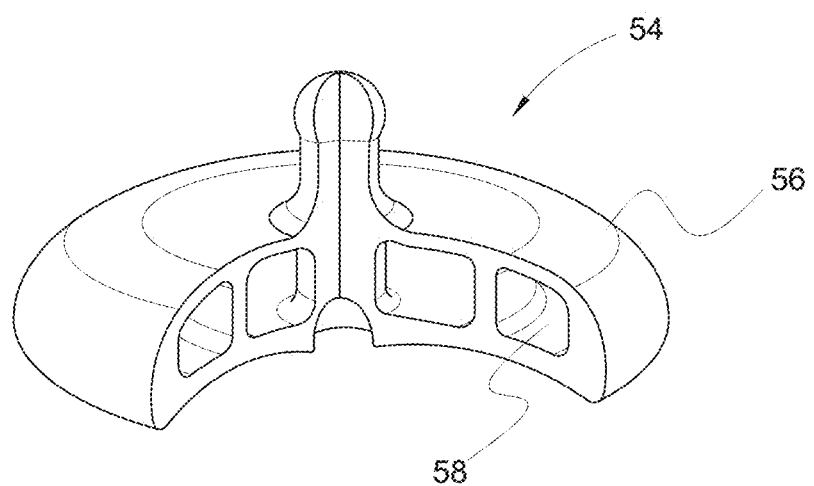
FIGS. 8a and 8b show an insulator disc and an insulator comprising a series of connected insulator discs, respectively, in accordance with an embodiment of the subject invention.

FIG. 6 provides a schematic block diagram of a wireless power transfer system 50 according to an embodiment of the subject invention. The system 50 comprises an insulator 52 formed from a series of connected insulator devices, e.g., insulator discs 54. A plurality of said series of insulator devices 54 may, as shown in FIG. 8a, each comprise a body 56 formed of an electrically insulating material, said body 56 defining a cavity 58. A resonator coil 60 is located within the cavity 58 with said coil 60 being configured for resonant inductive coupling with a similar such coil when placed in the vicinity of the similar such coil. The plurality of insulator devices 54 having an embedded resonator coil 60 may comprise a subset of the series of insulator devices such that not all insulator devices or discs in a series include a resonator coil 60. However, in many embodiments, all of the insulator discs 54 are provided with a resonator coil 60.

The wireless power transfer system 50 can include an energy transmitting coil 62 magnetically coupled to a first resonator coil insulator device 54a of said series of connected insulator devices for wirelessly delivering electrical energy to said first resonator coil insulator device 54a. Also provided is an energy receiving coil 64 magnetically coupled to a last resonator coil insulator device 54z of said series of connected insulator devices for wirelessly receiving electrical energy from said last resonator coil insulator device 54z. The plurality of insulator devices 54 having a resonator coil 60 are arranged within the series of devices so as to enable the near field transmission of electrical energy from a first end of the series to a second end of the series and vice-versa in some systems, i.e., the system 10 could be configured to be bi-directional.

The energy transmitting resonator coil 62 comprises a part of an energy harvesting circuit 66 that is configured to wirelessly harvest energy from a high voltage power transmission line 68 using a transformer (or a magnetically coupled device) 69. The energy harvesting circuit 66 may in some embodiments comprise an alternating current (AC) to direct current (DC) power converter 70 for charging one or more batteries or capacitors 72 and for feeding a DC to AC inverter 74. The DC to AC inverter 74 can be configured to provide a high frequency AC signal for driving the energy transmitting coil 62. The mains frequency of 50 Hertz (Hz) may be up-converted by the energy harvesting circuit 66 to a frequency of typically higher than 20,000 Hz for driving the energy transmitting resonator coil 62.

The energy receiving resonator coil 64 comprises part of an energy receiver circuit 76, which may include in some embodiments a high frequency AC to DC (or AC to AC) converter 80 for providing a supply voltage or current at levels suitable for powering monitoring apparatuses 82, which are configured to provide monitoring services such as electric parameters (e.g., voltage, current, phase angle, and power), mechanical parameters (e.g., tower structure, cable galloping, ice/snow thickness, and wind-induced mechanical vibration of transmission tower), thermal parameters (e.g., cable temperature), and/or weather information (e.g., wind speed, temperature and lightning, and pollution level), as well as anti-theft monitoring.

The series of connected insulator devices 54 comprising the insulator 52 define a wireless power transfer domino-resonator system, which is configured to direct the flow of electrical energy from the first end of the series to the second end of the series by means of near field transmission of electrical energy from one end of the series to the other end of the series. It will be understood that it is preferred that the insulator 52 is configured as an insulator for a high voltage power transmission system, but this is not an essential requirement of embodiments of the subject invention. In some embodiments, the insulator 52 is configured to support a power transmission cable. In many embodiments, the structures of the insulator 52 and the insulator discs 54 are changed as explained in more detail below, such that the insulator 52 may not be employed as a transmission line support device.

In some embodiments, the resonator coils 60 embedded inside the plurality of insulator devices 54 are identical for optimal transmission of electrical energy from the first end of the series to the second end of the series, and the plurality of insulator devices 54 is arranged with a distance between adjacent resonator coil insulator devices such that a mutual coupling factor between adjacent devices is sufficiently large for optimal or efficient transmission of electrical energy from the first end of the series to the second end of the series, preferably with said distance being similar or less than a size of the diameter of an embedded resonator coil 60. The distance between adjacent resonator coil insulator devices is preferably the same or substantially the same. The distance between the energy transmitting coil 62 and first resonator coil insulator device 54a of said series of connected insulator devices may be smaller than the distance between adjacent resonator coil insulator devices 54. Similarly, the distance between the energy receiving coil 64 and last resonator coil insulator device 54z of said series of connected insulator devices may be smaller than the distance between adjacent resonator coil insulator devices 54.

In some embodiments of the subject invention, the resonator coil can include one or more ferromagnetic materials in the resonator coil (e.g., in the center of the resonator coil). Such materials can focus the magnetic flux path. Also, such ferromagnetic materials can behave like a magnetic core in the inner region (e.g., central region) of the resonator coil. The ferromagnetic materials can include, for example, one or more soft ferrite materials, though embodiments are not limited thereto.

Figure 7:
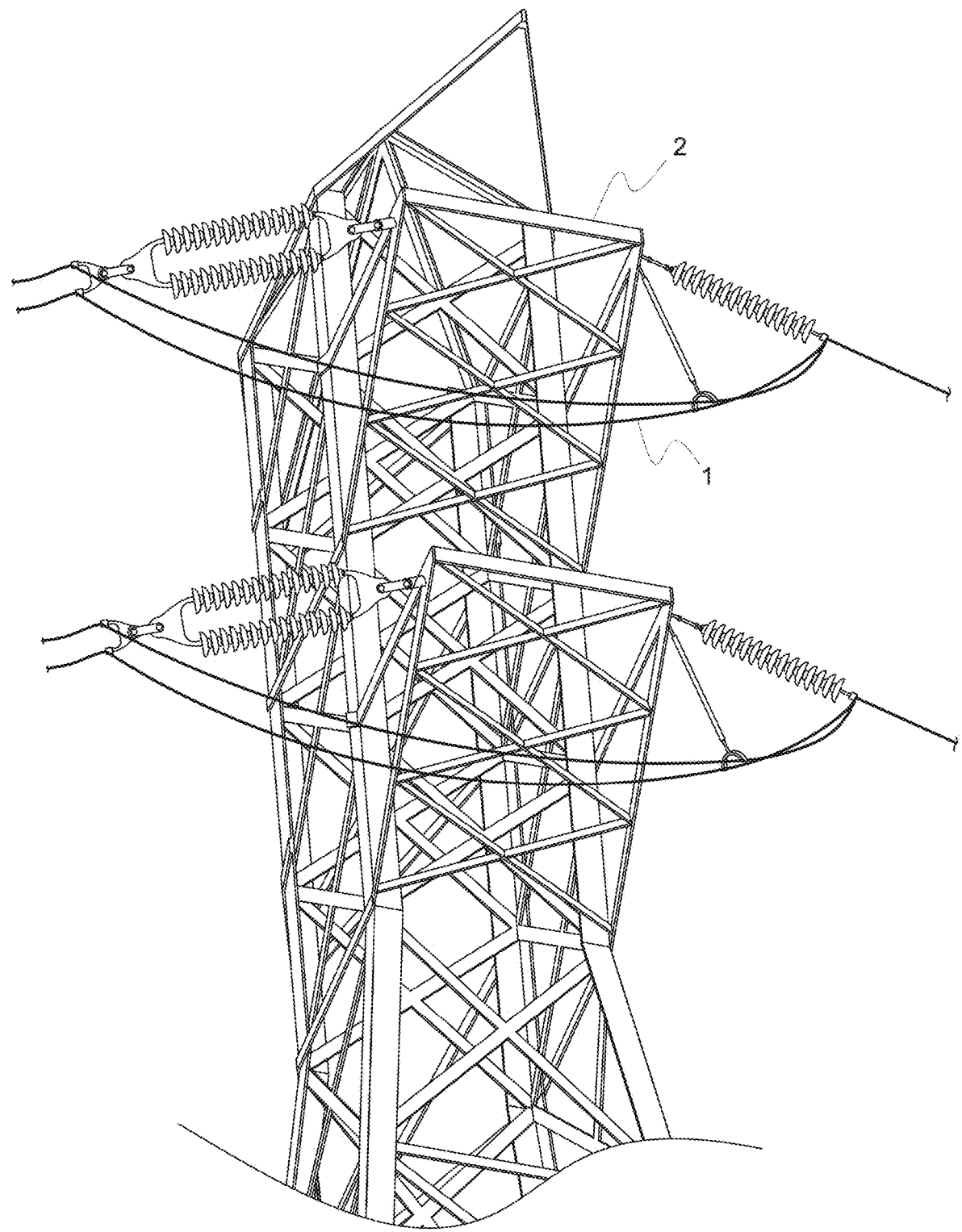
FIG. 7 shows an energy harvesting point and an energy receiving point on a high voltage power transmission system tower for a wireless power transfer system in accordance with an embodiment of the subject invention.

Referring to FIG. 7, an application of the present invention can be further illustrated by reference to an example of a standard power transmission system tower. The magnetic field generated by the transmission cable (marked as ① in FIG. 7) can be "continuously" harvested with a transformer and a power converter comprising the energy harvesting circuit 68 of FIG. 6. The harvested energy can be stored in one or more supercapacitors and/or rechargeable batteries (72 in FIG. 6). Because energy can be harvested from the power cable continuously without any time constraint (such as daytime only for solar panels), the storage capacity of the supercapacitor and/or battery 72 is expected to be much smaller than that for a solar power system. As the online monitoring system has to be mounted on the power transmission system tower (marked as ② in FIG. 7), which is earthed, there is a considerable transmission distance between the energy-harvesting point ① and the energy-receiving point ②.

According to IEC 60137 International Standard, Fifth edition, 2003, "Insulated bushings for alternating voltages above 1000V, the creepage distance depends on the voltage and the air pollution conditions as listed in Table 1 below:

TABLE 1

| IEC 60137 Standard on Creepage Distance for Voltage > 1000 V | |
|---|---|
| Condition | Creepage |
| Normal | 16 mm/kV |
| Medium pollution | 20 mm/kV |
| Heavy pollution | 25 mm/kV |
| Very Heavy Pollution | 31 mm/kV |

For a medium polluted condition and a transmission line voltage of 110 kiloVolts (kV), the creepage distance for wireless power transmission has to be at least 2.2 meters (m). Referring again to FIG. 3, which shows an example of a known insulator string holding the high voltage transmission line to the transmission tower, for transmission distances of this magnitude, traditional wireless power transmission techniques cannot achieve high efficiency (typically <15%) because such efficiency is inversely proportional to the transmission distance.

Embodiments of the subject invention address this problem through use of the disclosed novel insulator string or rod 52.

Referring again to FIGS. 8a and 8b, the resonator can comprise a coil connected in parallel with a resonator capacitor to form an inductive-capacitor resonator tank whereby a resonance frequency of the resonator coil is determined by the values of the inductor and the capacitor.

The electrically insulating material preferably comprises a material rated for use in high voltage power transmission systems.

Figure 8B:
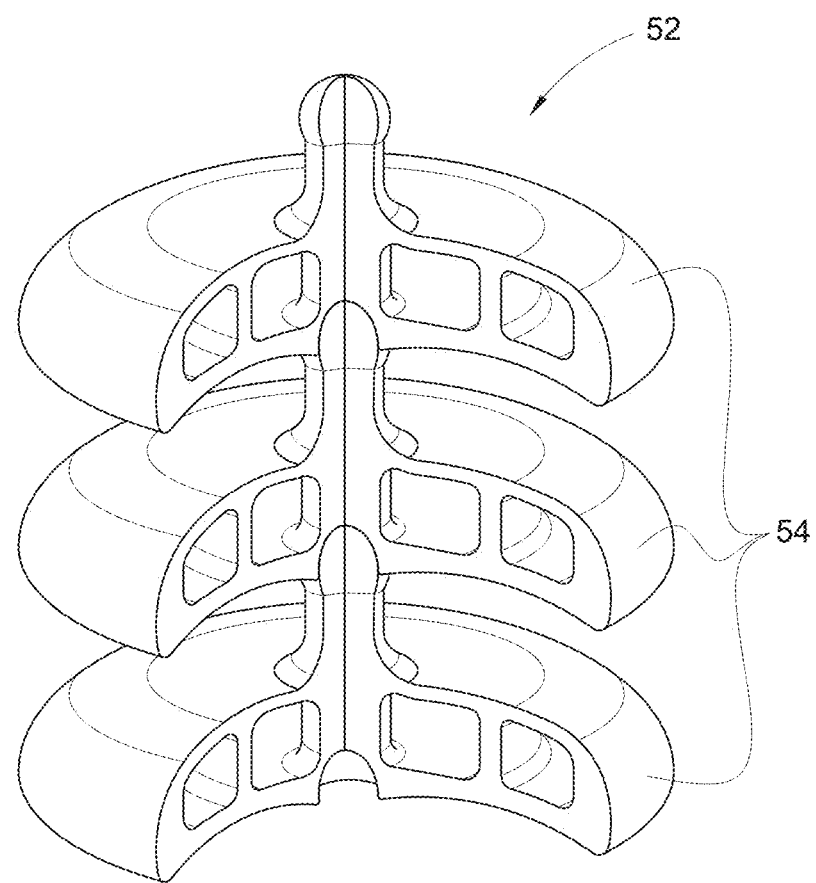
Figure 9:
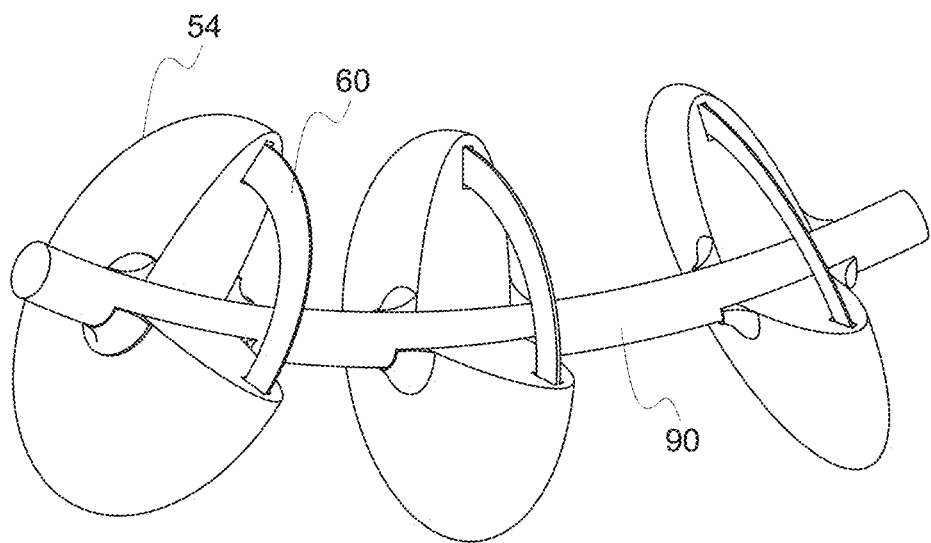
FIG. 9 shows part of a flexible insulator comprising a series of insulator discs with a section of each insulator disc removed to show an embedded resonator coil therewithin in accordance with an embodiment of the subject invention.

The insulator or insulator string 52 may connect the insulator devices or discs 56 by a rigid insulator shaft as shown in FIG. 8b or by a flexible insulator shaft as shown in FIG. 9.

The transmitter resonator coil 62 can be arranged in such a way that it is placed close to and magnetically coupled to the first resonator coil 54a in the series of insulator discs 54 on the transmitter side. Similarly, the last resonator coil 54z in the series of insulator discs 54 of the insulator rod or string can be placed close to the receiver resonator coil 64 for close magnetic coupling. The operation of the proposed insulator rod/string is based on the wireless domino-resonator systems of FIGS. 1 and 2. Based on the short-range magnetic resonance technique of [1] to [4], it has been shown that this approach is a good compromise of high energy efficiency and transmission distance.

It is important to note that the disclosed embodiments of the high voltage insulators (rods or strings) may have different functions when compared with traditional high voltage insulators. Traditional ones, such as those shown in FIGS. 3 to 5 are designed to provide the simultaneous functions of (i) mechanical support and (ii) high voltage insulator. The novel ones disclosed herein offer the simultaneous functions of (i) wireless power transmission over the creepage distance and (ii) high voltage insulation.

As described above, FIGS. 5a and 5b show the typical structure of a stackable insulator disc and its stacked-up structure, respectively. Because mechanical support is not a key function of the invention, the metallic pin and ball structures used for stacking up the discs in the traditional high voltage insulator rods can be replaced by non-metallic insulator materials.

Figure 10:
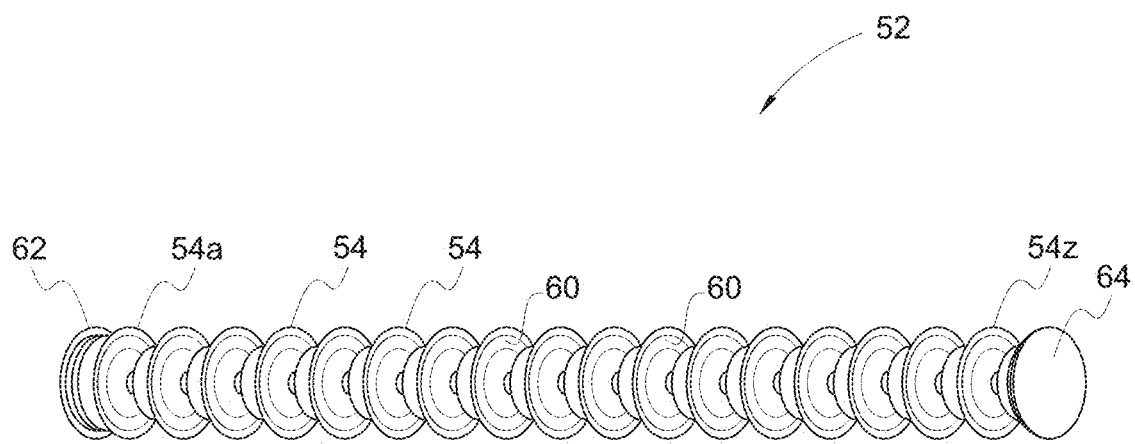
FIG. 10 depicts an insulator for a high voltage power transmission tower in accordance with an embodiment of the subject invention.
Figure 11:
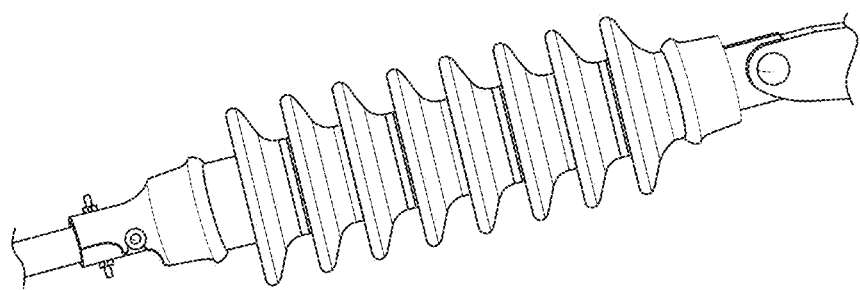
FIG. 11 shows a high-voltage insulation rod (string).
Figure 12:
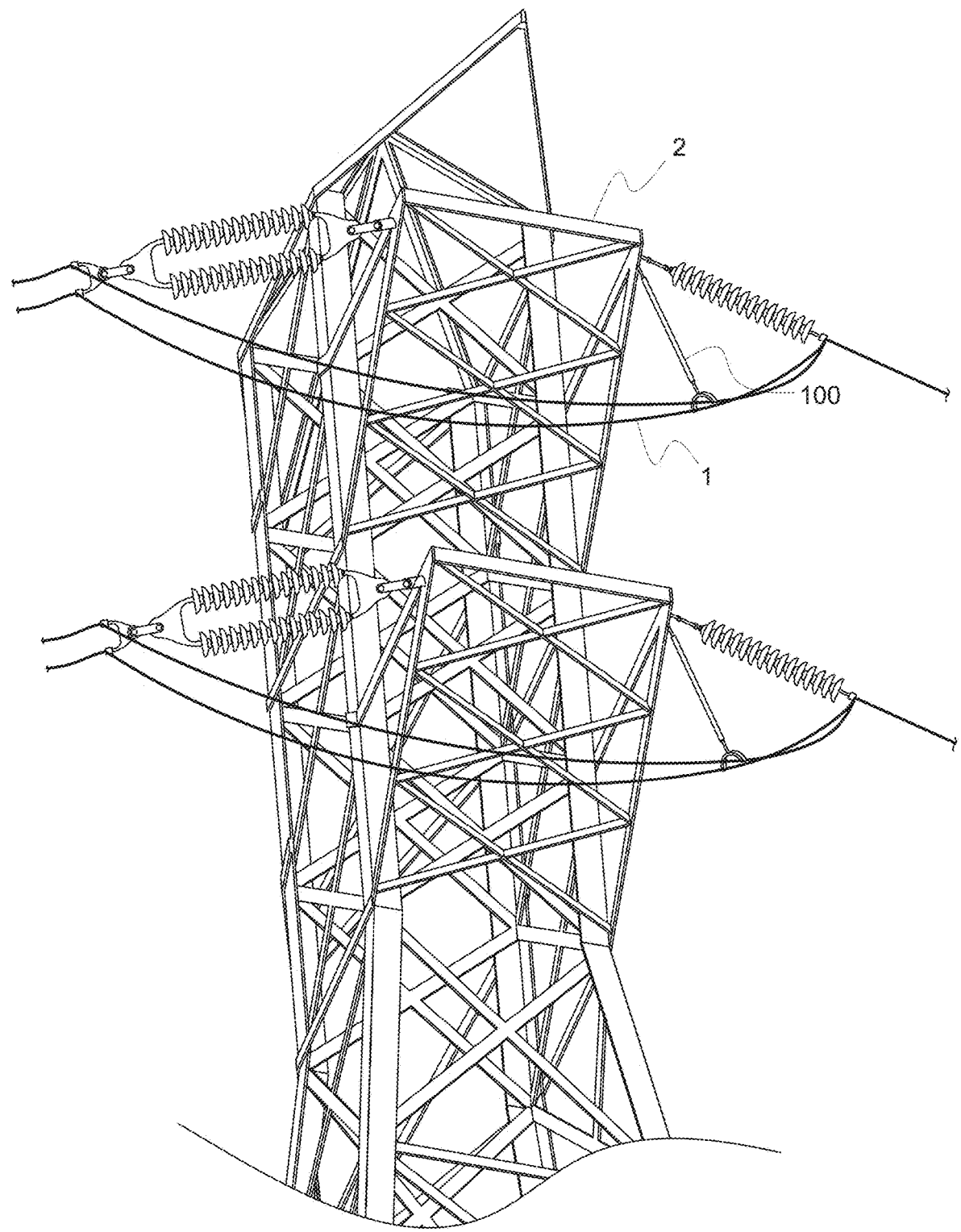
FIG. 12 shows an example of using a high voltage insulation rod to hold high voltage cable to a transmission tower.

In embodiments of the subject invention, a first insulator disc structure (FIG. 8) can be similar to the traditional one as shown in FIG. 5. It can have a stackable structure like the traditional one, except that the metallic pin and ball are replaced with electrical insulating materials. This is best seen in FIG. 8a. When stacked up in series (FIG. 8b), these stackable discs form an insulator rod with wireless power transfer capability. The second disc structure for the invention is shown in FIG. 9 and has a through-hole in its center for receiving a flexible shaft 90. The flexible shaft can be made of flexible insulating materials such as cross-linked polyethylene (XLPE or PEX) and/or polyvinyl chloride (PVC). The insulator discs 54 with embedded LC resonators can be mounted along this flexible insulating shaft. To facilitate a standard approach, the distance between adjacent insulator discs should preferably be the same (or substantially the same) as shown in FIG. 10. However, it is possible to optimize the power flow if the distance between the last two discs at each end of the insulator string is slightly different from the separation distance of the discs in the central portion of the string.

The insulator material for the discs can be of different types suitable for high voltage applications. Non-limiting examples are toughened glass, glazed porcelain, and polymer. In embodiments of the subject invention, while the series-connected insulator discs provide a high-voltage insulator, the series of coil-resonators provide a wireless power transfer path because these coil-resonators behave like a series of relay coil-resonators as in [1] to [4].

In general, embodiments of the subject invention relate to new structures of insulator discs with embedded resonator coils. By linking the insulator discs in a series using an appropriate mechanical mechanism, the insulator discs form an insulator or insulator string for a high power transmission line system. The resonator coils embedded inside the insulator discs therefore form a series of relay resonators that can be used for wireless power transfer through the principle of near-field magnetic coupling and resonance. Such an insulator string can provide the simultaneous functions of voltage insulator and wireless power transfer over the length of the string. Applications of embodiments of the subject invention are particularly suitable for, but not limited to, wireless power transfer in a high-voltage environment, such as encountered in high-voltage power transmission line systems.

Wireless power transfer systems are usually designed to operate at or close to the resonant frequency of the coil-resonators. At or close to the resonant frequency, the energy efficiency of the WPT system can be kept at the high level. It is therefore necessary to consider the accuracy and consistency of the inductive (L) and capacitive (C) parameters in these LC coil-resonators. Also, in order to facilitate easy and simple production procedure to embed the LC coil-resonators inside the HV insulation discs, it is necessary to consider suitable structures of the LC coil-resonators in view of the manufacturing process of the HV insulation discs. For example, some insulation discs are manufactured by injection molding machines.

Embodiments of the subject invention provide structures and methods of fabrication thereof of the LC coil-resonators that can ensure accuracy and consistency of the L and C parameters, as well as simple procedure for embedment inside the HV insulation discs.

Embodiments of the subject invention relate to new structures of insulator discs with embedded resonator coils. By linking the insulator discs in a series using an appropriate mechanical mechanism, the insulator discs form an insulator, insulator string, or insulator rod for a high power transmission line system. The resonator coils embedded inside the insulator discs therefore form a series of relay resonators that can be used for wireless power transfer through the principle of near-field magnetic coupling and resonance. Such an insulator string can provide the simultaneous functions of voltage insulation and wireless power transfer over the length of the string or rod. Applications of embodiments of the subject invention are particularly suitable for, but not limited to, wireless power transfer in a high-voltage environment, such as encountered in high-voltage power transmission line systems.

Figure 13:
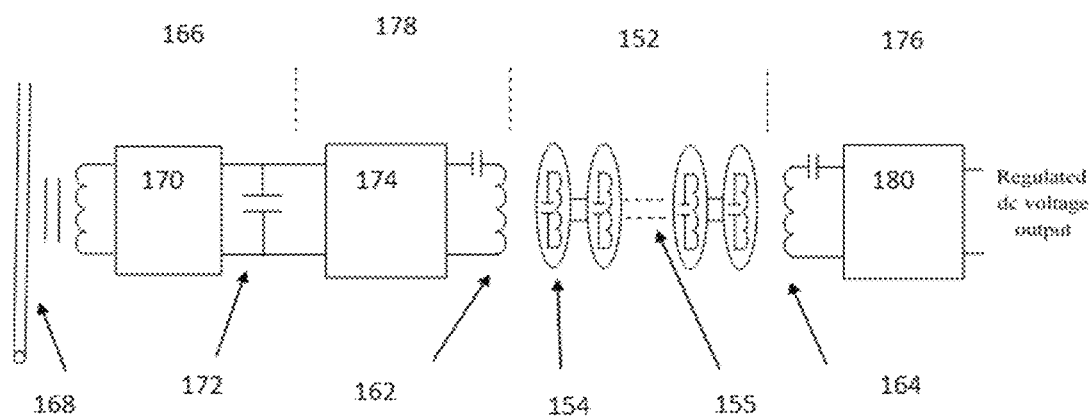
FIG. 13 is a schematic diagram of an embodiment of a wireless power transfer system for power systems.
Figure 18A:
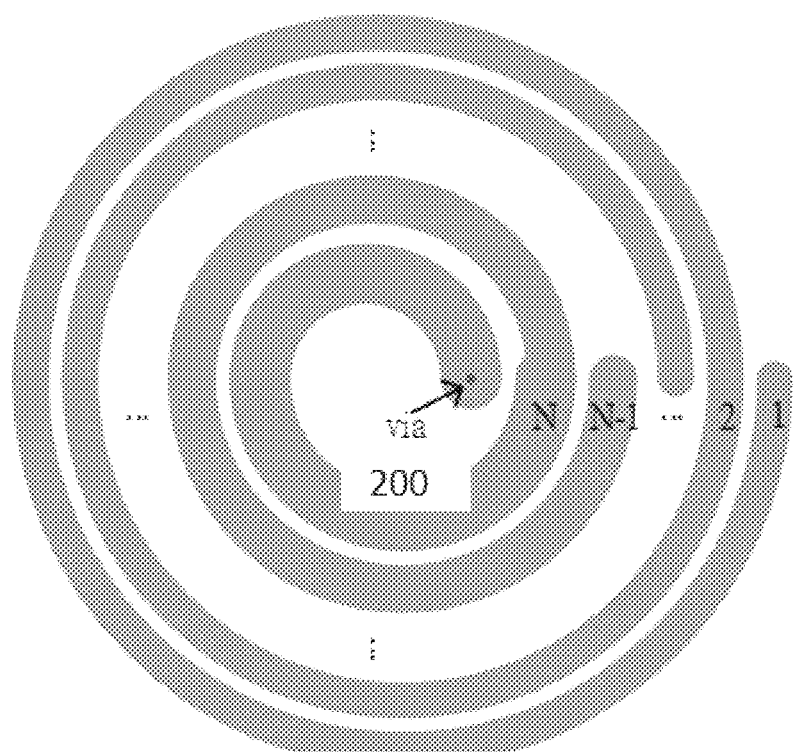
FIG. 18a is a diagram of the top view of a planar LC coil-resonator (with non-uniform track width).
Figure 18B:
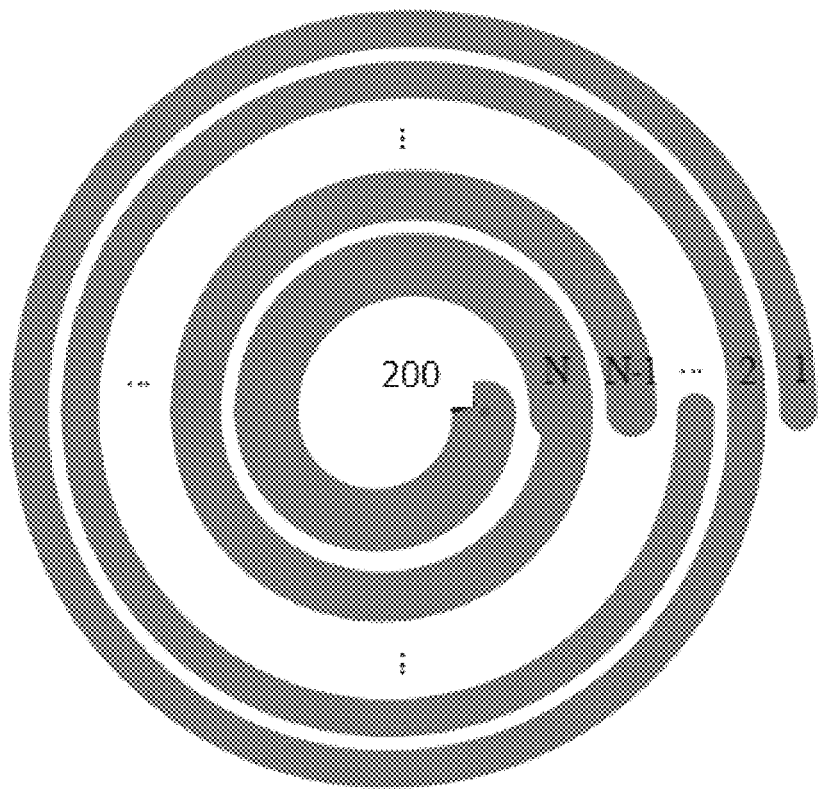
FIG. 18b is a diagram of the bottom view of a planar LC coil-resonator (with non-uniform track width).
Figure 18C:
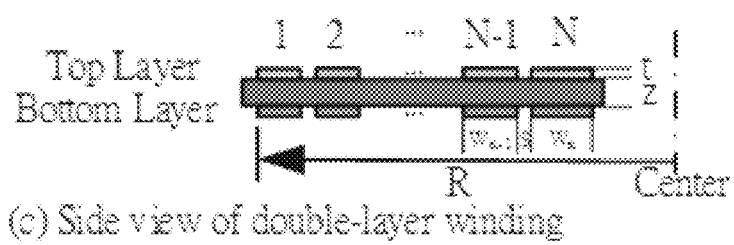
FIG. 18c is a diagram of a cross section of a planar LC coil-resonator (with two layers of PCB spiral windings of non-uniform track width).

FIG. 13 provides a schematic block diagram of a wireless power transfer system according to an embodiment of the subject invention. The system comprises an insulator rod-string of embedded relay LC coil-resonators 152 formed from insulation discs with an embedded relay LC coil-resonators devices 154 connected by an insulation shaft 155 (flexible or rigid). A plurality of said series of insulator devices 154 may, as shown in FIGS. 15c and 18c, each comprise at least two layers of printed planar and spiral conductive tracks, which are connected at one end to form a single equivalent inductor and are separated by non-conductive substrate with dielectric property, to form an inductive-capacitive (LC) coil-resonator for embedment inside high-voltage insulation discs and for acting as relay resonator for wireless power transfer.

The wireless power transfer system can include an energy transmitting coil 162 magnetically coupled to the relay coil-resonators 154 of said rod/string of embedded LC relay coil-resonators 152 for wirelessly delivering electrical energy to the first LC coil-resonator of the rod-string of embedded LC relay coil-resonators 152. Also provided is an energy receiving coil 164 magnetically coupled to a last LC coil-resonator of said rod-string of embedded LC relay coil-resonators 152 for wirelessly receiving electrical energy from said last LC coil-resonator. The plurality of LC coil-resonator devices 154 can be arranged within the series of devices so as to enable the near field transmission of electrical energy from a first end of the series to a second end of the series and vice-versa in some systems, i.e., the system could be configured to be bi-directional.

The energy transmitting resonator coil 162 comprises a part of an energy harvesting circuit 166 that is configured to wirelessly harvest energy from a high voltage power transmission line 168 using a transformer (or a magnetically coupled device). The energy harvesting circuit 166 may in some embodiments comprise an alternating current (AC) to direct current (DC) power converter 170 for charging one or more batteries or capacitors 172 and for feeding a DC to AC inverter 174. The DC to AC inverter 174 can be configured to provide a high frequency AC signal for driving the energy transmitting coil 162. The DC to AC converter 174 is component of an energy-transmitter circuit 178. The mains frequency of 50 Hertz (Hz) may be up-converted by the energy harvesting circuit 166 to a frequency of typically higher than 20,000 Hz for driving the energy transmitting resonator coil 162.

The energy receiving resonator coil 164 comprises part of an energy receiver circuit 176, which may include in some embodiments a high frequency AC to DC (or AC to AC) converter 180 for providing a supply voltage or current at levels suitable for powering monitoring apparatuses, which are configured to provide monitoring services such as electric parameters (e.g., voltage, current, phase angle, and power), mechanical parameters (e.g., tower structure, cable galloping, ice/snow thickness, and wind-induced mechanical vibration of transmission tower), thermal parameters (e.g., cable temperature), and/or weather information (e.g., wind speed, temperature and lightning, and pollution level), as well as anti-theft monitoring.

Figure 14:
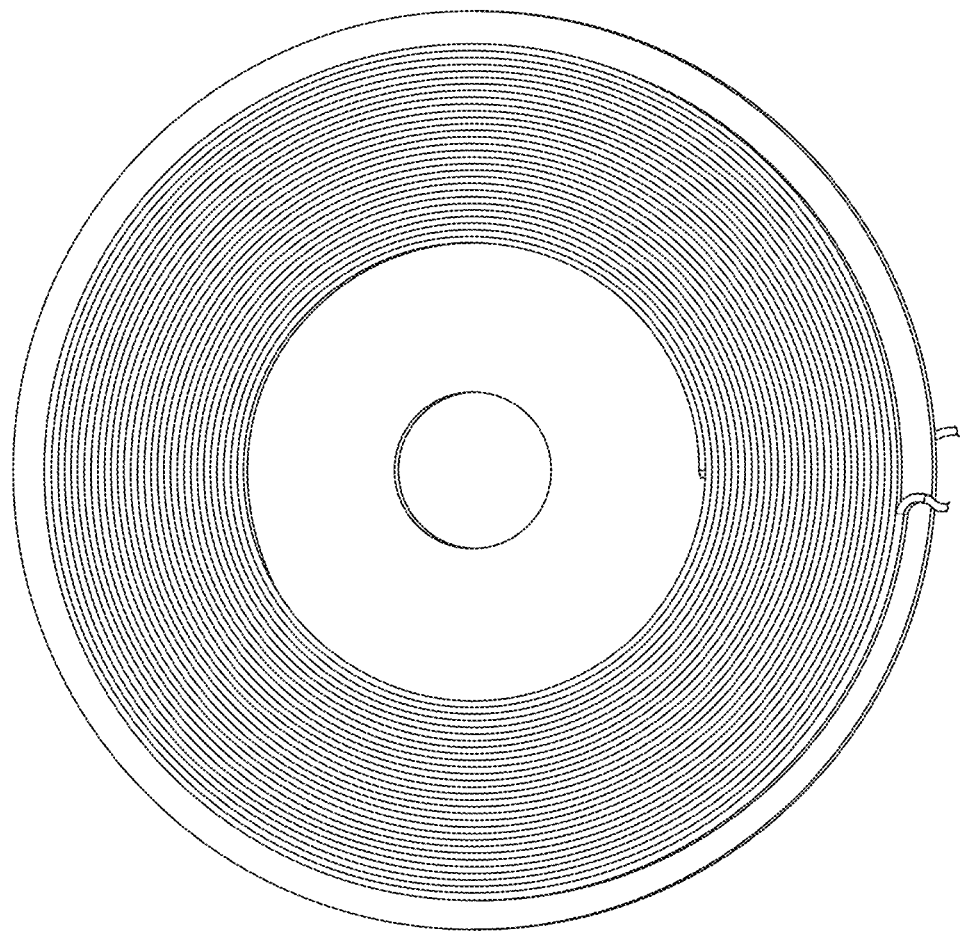
FIG. 14 shows a top view of a printed circuit board (PCB) LC coil-resonator (with a uniform track width).

A method to manufacture an LC coil-resonator with accurate and consistent LC parameters is to use the printed-circuit-board (PCB) technology. FIG. 14 shows a photograph of one example of a LC coil-resonator printed on the two sides of a printed circuit board.

Figure 15A:
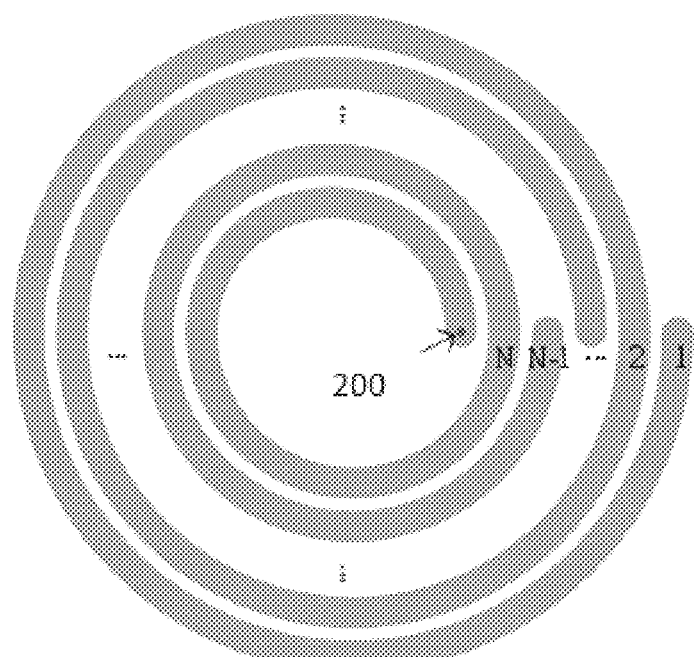
FIG. 15a is a diagram of the top view of a planar LC coil-resonator (with uniform track width).
Figure 15B:
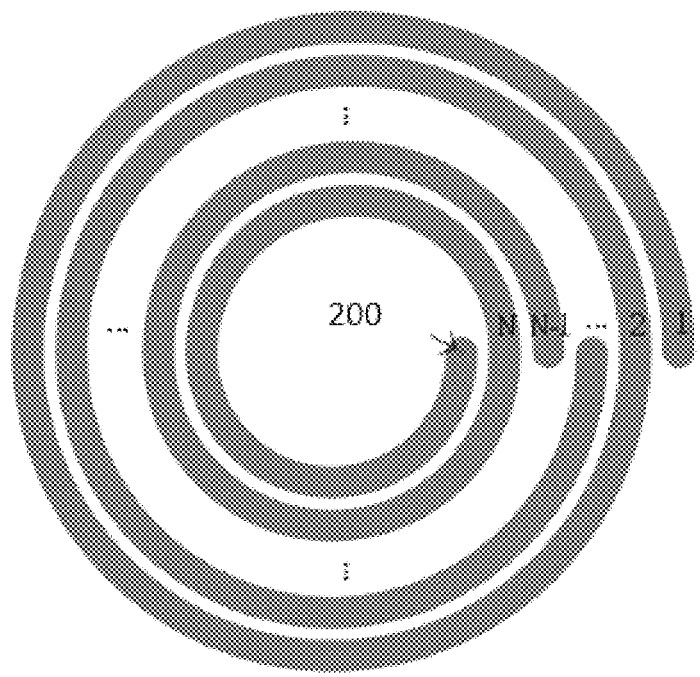
FIG. 15b is a diagram of the bottom view of a planar LC coil-resonator (with uniform track width).
Figure 15C:
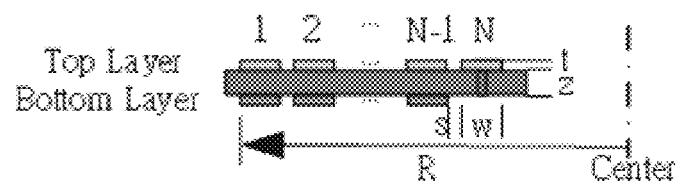
FIG. 15c is a diagram of a cross section of a planar LC coil-resonator (with two layers of PCB spiral windings of uniform track width).

The LC coil-resonator can comprise a top and bottom layer of planar spiral windings as shown in FIG. 15*a* and FIG. 15*b*. A vertical cross-sectional structure including the top layer and bottom layer is shown in FIG. 15*c*. These planar spiral windings are electrically conductive tracks (such as copper or silver). FIG. 15*a* shows a top layer comprising continuous conductive track fabricated or printed in the form of a planar spiral winding with N turns on one side of the PCB. A similar planar winding can be printed on the opposite side of the PCB board, as seen in FIG. 15*b*. It is important to note that these two layers of planar windings (i.e. spiral conductive tracks) are connected through vias 200 at one end of the coils in order to form an equivalent single inductor. In the example shown in FIG. 15, the ends of the most inner turn of the two conductive tracks are connected together through the use of vias 200. Several vias 200 may be used in order to reduce the resistance of this connection.

With the exception the point at which the two layers of conductive tracks are connected, the rest of the two layers of the conductive tracks are physically separated by the non-conductive PCB substrate with dielectric property, thus forming the structure of a "capacitor". Any induced current in the equivalent inductor will flow through the stray capacitance between the two layers of conductive tracks. In this way, the distributed inductance and capacitance of the layered conductive tracks form an equivalent inductive-capacitive (LC) coil-resonator. The resonant frequency of this LC coil-resonator is defined by the distributed inductance and capacitance of the layered structure of the conductive tracks. The distributed capacitance depends on the separation distance between the two layers and the overlap area of conductive tracks, as well as the dielectric constant of the non-conductive substrate that separates the two conductive tracks.

Figure 16:
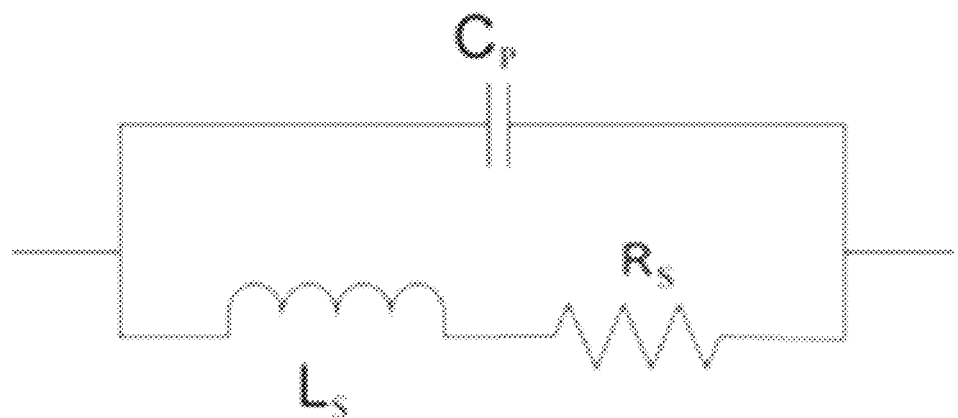
FIG. 16 is a diagram of a lumped element circuit model of a LC coil-resonator.

The distributed inductance and capacitance of this structure can be considered as an LC coil-resonator, which can be represented by a lumped equivalent circuit as shown in FIG. 16, in which the resistor R represents the AC resistance of the equivalent inductor. In general, the winding resistance R depends on the effective conducting area in the cross-section and the length of the conductive tracks. It will affect the quality (Q) factor of the LC coil-resonator, which is defined by $Q=\omega L/R$ and $\omega=2\pi f$ and f is the operating frequency. A low winding resistance will lead to a high Q factor, in turn, enables high energy efficiency in the wireless power transfer. For this reason, it is preferred not to extend the spiral winding into the central area of the PCB. In the central region, the flux density is highest and it will induce heat loss (power loss) in the conductive tracks, resulting in an increase in the equivalent winding resistance R. Extending the turns of the coil near the central area will only increase R without increasing the winding inductance L proportionally. Such practice will reduce the Q factor and thus the energy efficiency of the wireless power transfer.

Figure 17:
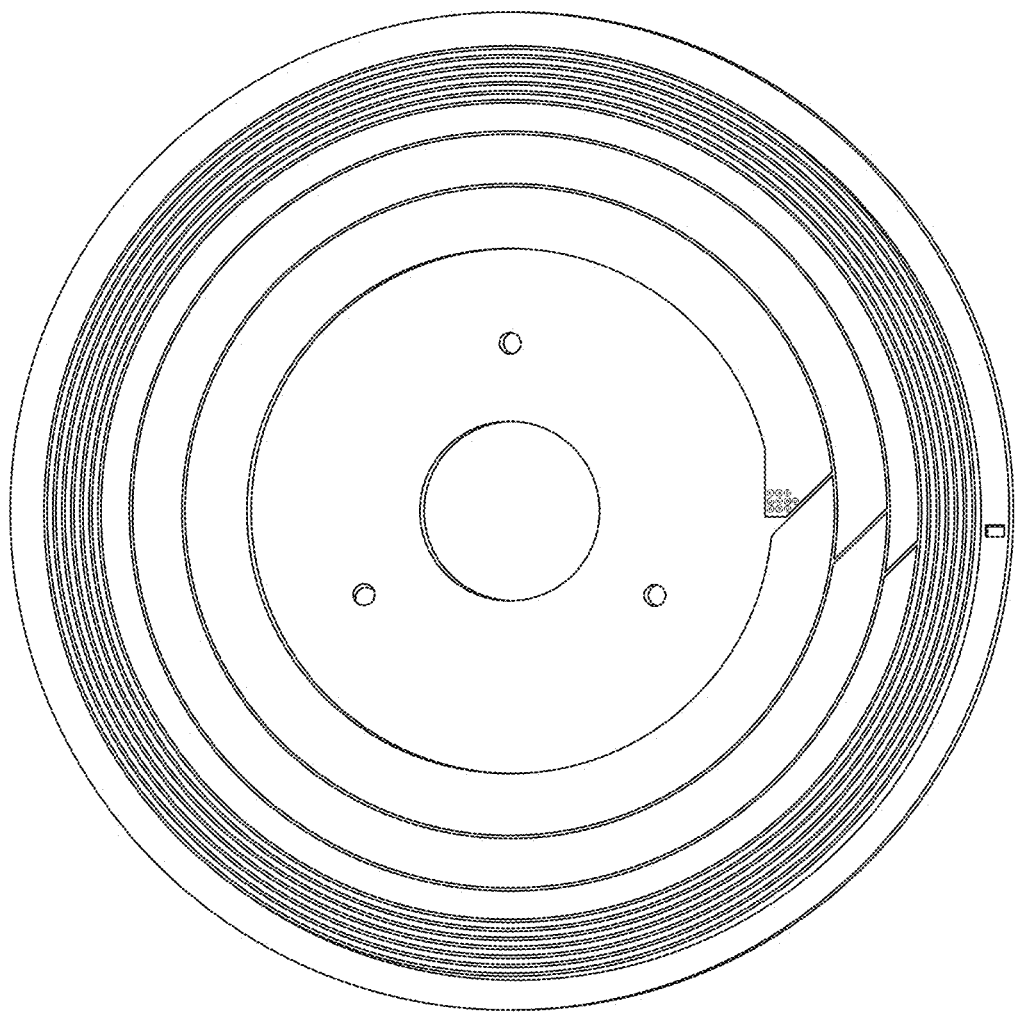
FIG. 17 shows a top view of a PCB LC coil-resonator (with non-uniform track width).
Figure 20A:
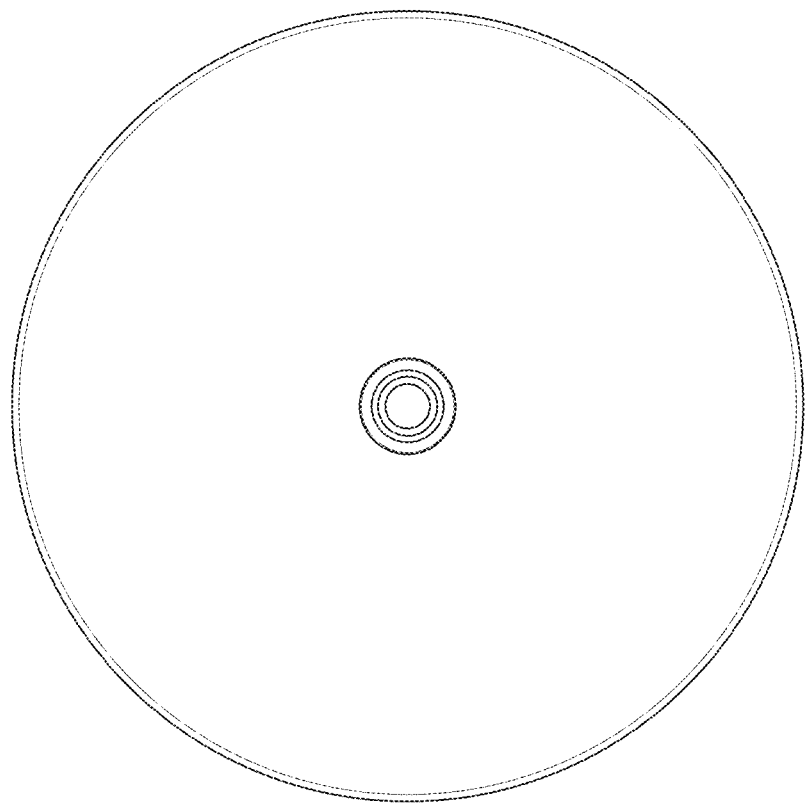
FIG. 20a shows an insulation disc embedded with an LC coil-resonator.
Figure 20B:
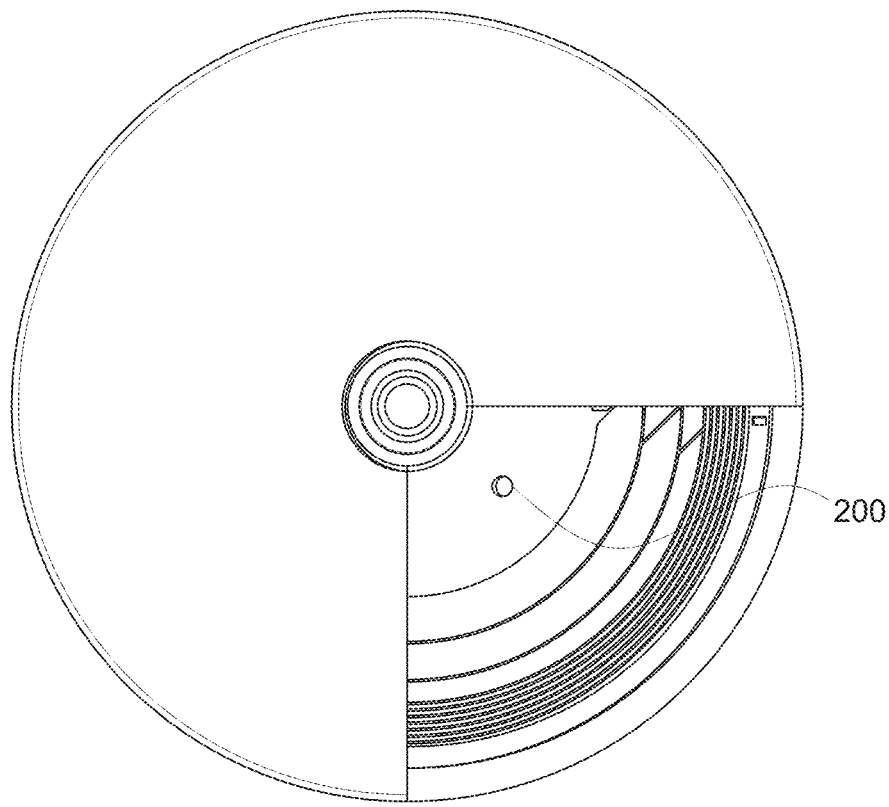
FIG. 20b an insulation disc with a partially exposed embed LC coil-resonator.

In the embodiments as seen in FIGS. 14 and 15, the printed conductive tracks of equal width are adopted in the LC coil-resonator. However, in other embodiments as seen in FIGS. 17 and 18 the width of the conductive track increases as the track spirals into the inner region. Because the flux density within the area of the printed coil is not uniform, the non-uniform track width design could reduce the overall winding resistance R if the printed coil pattern is properly designed. FIGS. 18*a-c*, show top, bottom, and vertical cross-sectional views of this embodiment, respectively. FIG. 20*a* shows an insulation disc embedded with an LC coil-resonator, and FIG. 20*b* shows part of the embedded LC coil-resonator when part of the insulation disc cover is removed.

Figure 21:
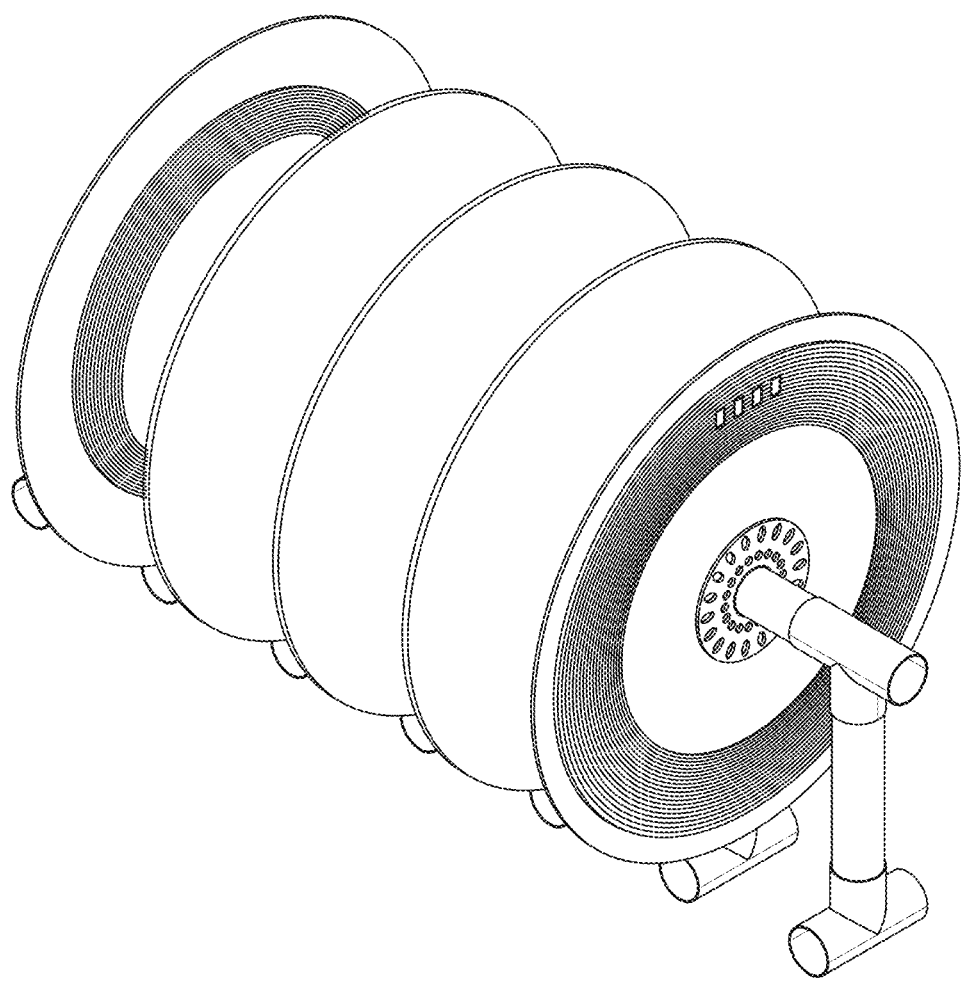
FIG. 21 shows an experimental setup demonstrating the wireless power transfer capability of the LC coil-resonators embedded inside high-voltage insulation discs for powering an LED lighting load.

In order to confirm the feasibility of this invention, an experimental setup was used to demonstrate that the LC coil-resonators embedded inside the HV insulation discs can act as relay resonators for WPT. FIG. 21 shows an image of the experimental setup, which comprises (i) one Transmitter coil-resonator, three LC coil-resonators embedded inside the HV insulation discs and one Receiver coil-resonator loaded with light-emitting diodes (four 8 W LEDs). The distance between adjacent HV insulation discs is about 10 cm and the total transmission distance in this example is 40 cm. An high-frequency power supply was used to drive the transmitter coil-resonator at about 850 kHz. An energy efficiency of about 72% has been achieved in this practical example.

The experiment confirmed that (i) it is practically feasible to fabricate HV insulation discs with the proposed LC coil-resonators embedded and (ii) such structures can be used for wireless power transfer with an energy efficiency well above 50%.

Figure 19:
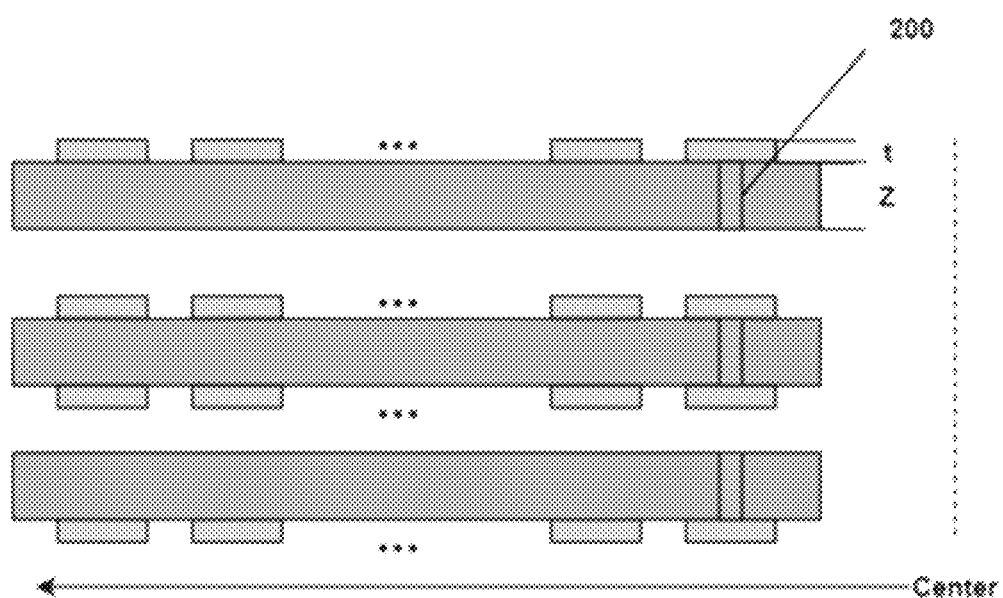
FIG. 19 is a diagram of a cross section of a multilayered planar LC coil-resonator.

PCB technology is used in certain embodiments of the subject invention to fabricate the planar LC coil-resonators. While PCB technology has been well established and mature, in other embodiments other fabrication processes such as 3D printing can also be used. In addition, PCB technology commonly uses FR4 materials as the non-conductive materials due to their high-voltage insulation features. In other embodiments, other non-conductive materials can also be used in principle. Further, one embodiment comprises a 2-layer PCB structure. In other embodiments, multilayer structures, as seen in FIG. 19, can be used if deemed appropriate to obtain the desired inductance and capacitance values for the LC coil-resonators.

With modern printed technology, LC coil-resonators with precise structures and parameters can be manufactured in mass production. The proposed printed LC coil-resonators will facilitate the easy fabrication of new insulation discs with embedded LC coil-resonators.

Reference in this specification to "one embodiment" or "an embodiment" means that a particular feature, structure, or characteristic described in connection with the embodiment is included in at least one embodiment of the invention. The appearances of the phrase "in one embodiment" or "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described that may be requirements for some embodiments but not other embodiments.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

REFERENCES

[1] S. Y. R. Hui and W. X. Zhong, "Apparatus and Method for Wireless Power Transfer", Patent application PCT/IB2011/000050, 14 Jan. 2011;
[2] W. X. Zhong, C. K. Lee and S. Y. R. Hui, "General Analysis on the Use of Tesla's Resonators in Domino Forms for Wireless Power Transfer", IEEE Transactions on Industrial Electronics, Vol. 60, No. 1, January 2013, pp: 261-270;
[3] C. K. Lee, W. X. Zhong and S. Y. R. Hui, "Effects of Magnetic Coupling of Non-adjacent Resonators on Wireless Power Domino-Resonator Systems", IEEE Transactions on Power Electronics, Volume: 27, Issue: 4, 2012, Page(s): 1905-1916; and
[4] W. X. Zhong, C. K. Lee and S. Y. R. Hui, "Wireless Power Domino-Resonator Systems with Non-coaxial axes and Circular Structures", IEEE Transactions on Power Electronics Volume: 27, Issue: 11, 2012, Page(s): 4750-4762.
[5] R. Berthiaume and R. Blais, "Microwave repeater power supply tapped from the overhead ground wire on 735 kV transmission lines," IEEE Trans. Power App. Syst., vol. PAS-99, no. 1, pp. 183-184, January/February 1980.
[6] A. Kurs, A. Karalis, R. Moffatt, J. D. Joannopoulos, P. Fisher, and M. Soljacic, "Wireless power transfer via strongly coupled magnetic resonances," Science, vol. 317, no. 5834, pp. 83-86, July 2007.
[7] S. Y. R. Hui, W. X. Zhong and C. K. Lee, "A critical review of recent progress in mid-range wireless power transfer", IEEE Transactions on Power Electronics, Vol. 29, No. 9, September 2014, pp:4500-4511.

What is claimed is:

1. An inductive-capacitive (LC) coil-resonator device, comprising:
    a first LC coil resonator;
    a second LC coil resonator; and
    a shaft connected to a center of the first LC coil resonator and a center of the second LC coil resonator,
    wherein each of the first LC coil resonator and the second LC coil resonator comprises:
        an insulating disc;
        a non-conductive substrate layer, with dielectric characteristics, embedded in the insulating disc;
        a top planar and spiral conductive track forming a coil and disposed on a top surface of the substrate layer and embedded in the insulating disc;
        a bottom planar and spiral conductive track forming a coil and disposed on a bottom surface of the substrate layer and embedded in the insulating disc, the bottom planar and spiral conductive track being parallel to the top planar and spiral conductive track; and
        a via directly connecting the bottom planar and spiral conductive track to the top planar and spiral conductive track to form a single equivalent inductor,
    wherein the first LC coil resonator is physically spaced apart from the second LC coil resonator.

2. The device of claim 1, wherein each of the first LC coil resonator and the second LC coil resonator comprises a plurality of vias directly connecting the bottom planar and spiral conductive track to the top planar and spiral conductive track.

3. The device of claim 1, wherein the substrate layer of each of the first LC coil resonator and the second LC coil resonator comprises a printed-circuit-board (PCB).

4. The device of claim 1, wherein the substrate layer of each of the first LC coil resonator and the second LC coil resonator comprises FR-4 glass-reinforced epoxy.

5. The device of claim 1, wherein, in each of the first LC coil resonator and the second LC coil resonator, a track width of the top and bottom planar and spiral conductive tracks is uniform across each respective coil.

6. The device of claim 1, wherein, in each of the first LC coil resonator and the second LC coil resonator, a track width of the top and bottom planar and spiral conductive tracks is non-uniform across each respective coil.

7. The device of claim 1, wherein, in each of the first LC coil resonator and the second LC coil resonator, a track width of the top and bottom planar and spiral coil increases as each respective track spirals towards an inner region of each coil.

8. The device of claim 1, wherein each of the first LC coil resonator and the second LC coil resonator comprises a plurality of stacked substrate layers and a plurality of planar and spiral conductive tracks, wherein each track forms a coil and is separated from each of the other planar and spiral conductive tracks by at least one substrate layer.

9. The device of claim 1, wherein the shaft is rigid.

10. The device of claim 1, wherein the shaft is flexible.

11. The device of claim 1, wherein the first LC coil resonator is configured to be magnetically coupled to a transmitter coil of an energy transmitting circuit.

12. The device of claim 1, wherein the second LC coil resonator is configured to be magnetically coupled to a receiver coil of an energy receiving circuit.

13. The device of claim 11, wherein the energy transmitting circuit comprises a part of a magnetic energy harvesting circuit.

14. The device of claim 13, wherein the magnetic energy harvesting circuit is configured to wirelessly harvest energy from a high voltage power transmission line.

15. A wireless power transfer system, comprising:
- a magnetic energy harvesting circuit configured to wirelessly harvest energy from a high voltage power transmission line;
- the device according to claim 1; and
- an energy receiving circuit,
- wherein the first LC coil resonator is magnetically coupled to a transmitter coil of the magnetic energy harvesting circuit, and
- wherein the second LC coil resonator is magnetically coupled to a receiving coil of the energy receiving circuit.

* * * * *